US012479076B2

(12) United States Patent
Duncan et al.

(10) Patent No.: US 12,479,076 B2
(45) Date of Patent: Nov. 25, 2025

(54) BULK METALLIC GLASS COMPONENTS FOR A POWER TOOL

(71) Applicant: MILWAUKEE ELECTRIC TOOL CORPORATION, Brookfield, WI (US)

(72) Inventors: Ian A. Duncan, Colgate, WI (US); Anthony E. Breitbach, Muskego, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/730,603

(22) PCT Filed: Jan. 20, 2023

(86) PCT No.: PCT/US2023/011260
§ 371 (c)(1),
(2) Date: Jul. 19, 2024

(87) PCT Pub. No.: WO2023/141283
PCT Pub. Date: Jul. 27, 2023

(65) Prior Publication Data

US 2025/0170694 A1 May 29, 2025

Related U.S. Application Data

(60) Provisional application No. 63/306,841, filed on Feb. 4, 2022, provisional application No. 63/301,533, filed on Jan. 21, 2022.

(51) Int. Cl.
*B25D 11/00* (2006.01)
*B25D 11/10* (2006.01)

(52) U.S. Cl.
CPC ...... *B25D 11/106* (2013.01); *B25D 2211/064* (2013.01); *B25D 2222/21* (2013.01)

(58) Field of Classification Search
CPC ............ B25D 11/106; B25D 2211/064; B25D 2222/21; B25D 11/064
(Continued)

(56) References Cited

U.S. PATENT DOCUMENTS

2014/0083641 A1* 3/2014 Waniuk .................. B22D 17/08 164/113
2019/0283222 A1 9/2019 Thorson et al.
(Continued)

FOREIGN PATENT DOCUMENTS

CN 207086974 U 3/2018

OTHER PUBLICATIONS

Eutectix, "Bulk Metallic Glass—The Next Metal," Data Sheet, available at least as early as Jan. 19, 2023 (2 pages).
(Continued)

*Primary Examiner* — Jacob A Smith
(74) *Attorney, Agent, or Firm* — Michael Best & Friedrich LLP

(57) ABSTRACT

A power tool includes a drive mechanism, a housing enclosing at least a portion of the drive mechanism, a spindle rotatable in response to receiving torque from the drive mechanism, a first drive element coupled for co-rotation with the spindle, the first drive element including a first sliding contact surface, and a second drive element rotationally fixed to the housing, the second drive element including a second sliding contact surface engageable with the first sliding contact surface while the spindle rotates. At least one of the first drive element or the second drive element includes an amorphous metal material.

20 Claims, 6 Drawing Sheets

(58) Field of Classification Search
USPC ............................ 173/48; 148/403, 324, 330
See application file for complete search history.

(56) References Cited

U.S. PATENT DOCUMENTS

| | | | | |
|---|---|---|---|---|
| 2020/0282582 | A1* | 9/2020 | Hofmann .................. | E21B 4/06 |
| 2020/0284146 | A1* | 9/2020 | Yahnker ................ | E21B 49/005 |
| 2021/0107128 | A1* | 4/2021 | Lu .......................... | B25D 17/24 |
| 2021/0299837 | A1 | 9/2021 | Garces et al. | |

OTHER PUBLICATIONS

International Search Report and Written Opinion for Application No. PCT/US2023/011260 dated May 9, 2023 (13 pages).

* cited by examiner

BULK METALLIC GLASS COMPONENTS FOR A POWER TOOL

CROSS-REFERENCE TO RELATED APPLICATIONS

This application claims priority to U.S. Provisional Patent Application No. 63/301,533, filed Jan. 21, 2022, and to U.S. Provisional Patent Application No. 63/306,841, filed Feb. 4, 2022, the entire contents of both of which are incorporated herein by reference.

FIELD

The present disclosure relates to power tools and more particularly to bulk metallic glass components in power tools, such as hammer drills, fastener drivers, and the like.

BACKGROUND

Some power tools, such as hammer drills, fastener drivers, and the like, include components which undergo extensive wear over time. For example, hammer drills include ratchet plates, which engage each other at high impact, causing strain and wear to the plates after extended use. Generally, such hammering components made of crystalline metals (e.g., aluminum, steel, metal alloys, etc.).

SUMMARY

The present disclosure provides, in one aspect, a power tool including a drive mechanism, a housing enclosing at least a portion of the drive mechanism, a spindle rotatable in response to receiving torque from the drive mechanism, a first drive element coupled for co-rotation with the spindle, the first drive element including a first sliding contact surface, and a second drive element rotationally fixed to the housing, the second drive element including a second sliding contact surface engageable with the first sliding contact surface while the spindle rotates. At least one of the first drive element or the second drive element includes an amorphous metal material.

In some embodiments, the amorphous metal material includes a bulk metallic glass.

In some embodiments, the first drive element includes a first plurality of teeth defining the first sliding contact surface, and the second drive element includes a second plurality of teeth defining the second sliding contact surface.

In some embodiments, the first drive element and the second drive element are both made of the amorphous metal material.

In some embodiments, the first drive element and the second drive element are molded from the amorphous metal material.

In some embodiments, the first drive element and the second drive element are coated with the amorphous metal material.

In some embodiments, the amorphous metal material has a yield strength of at least 1700 MPa and an elastic modulus of at least 90 GPa.

In some embodiments, the drive mechanism includes an electric motor, and wherein the power tool further comprises a battery pack configured to provide power to the electric motor.

In some embodiments, the second drive element includes a generally annular body and a plurality of radially-extending projections spaced about an outer periphery of the body.

In some embodiments, the spindle includes the amorphous metal material.

In some embodiments, the power tool includes a clutch assembly configured to selectively limit torque transfer from the drive mechanism to the spindle.

The present disclosure provides, in another aspect, a power tool including a drive mechanism with a drive element operable to impart an axial force to a workpiece. The drive element includes bulk metallic glass.

In some embodiments, the drive mechanism includes a rotatable spindle driven by the motor, and the drive element includes a ratchet configured to impart a reciprocating motion to the spindle.

In some embodiments, the power tool is a nailer, and the drive element is a driver blade of the nailer, the driver blade including a body and a plurality of teeth.

In some embodiments, the bulk metallic glass has a yield strength of at least 1700 MPa and an elastic modulus of at least 90 GPa.

In some embodiments, the bulk metallic glass is coated on to the drive element.

In some embodiments, the bulk metallic glass is molded to form the drive element.

In some embodiments, the power tool includes a housing enclosing at least a portion of the drive mechanism and a spindle rotatable in response to receiving torque from the drive mechanism. The drive element is a first drive element coupled for co-rotation with the spindle, the first drive element including a first sliding contact surface.

In some embodiments, the power tool includes a second drive element rotationally fixed to the housing, the second drive element including a second sliding contact surface engageable with the first sliding contact surface while the spindle rotates. The second drive element includes bulk metallic glass.

The present disclosure provides, in another aspect, a transducer for a power tool, the transducer including a hub, an outer ring surrounding the hub, and a plurality of webs interconnecting the hub and the outer ring. The transducer is molded from bulk metallic glass.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
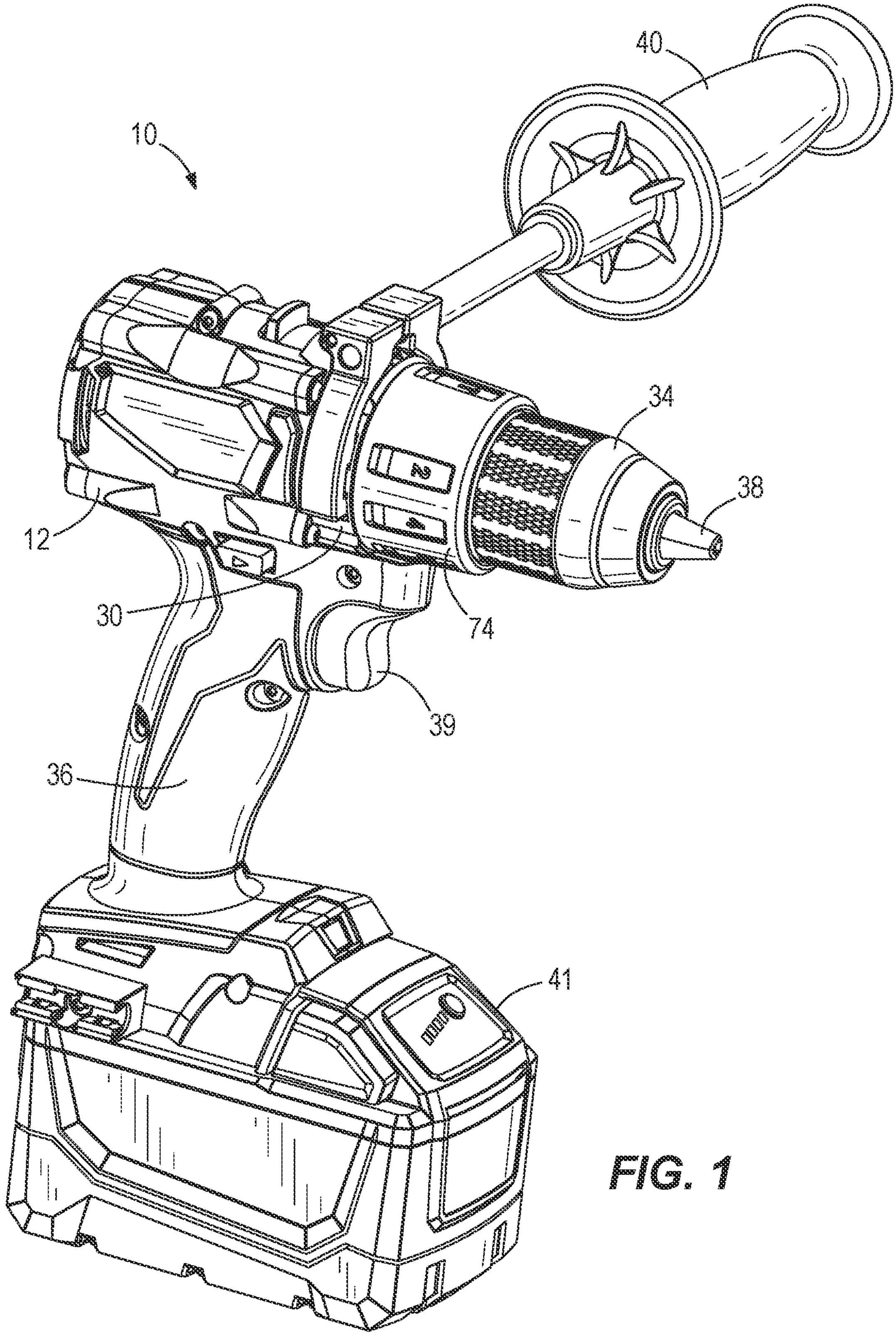
FIG. 1 is a perspective view of an exemplary power tool in the form of a hammer drill according to one embodiment.
Figure 2:
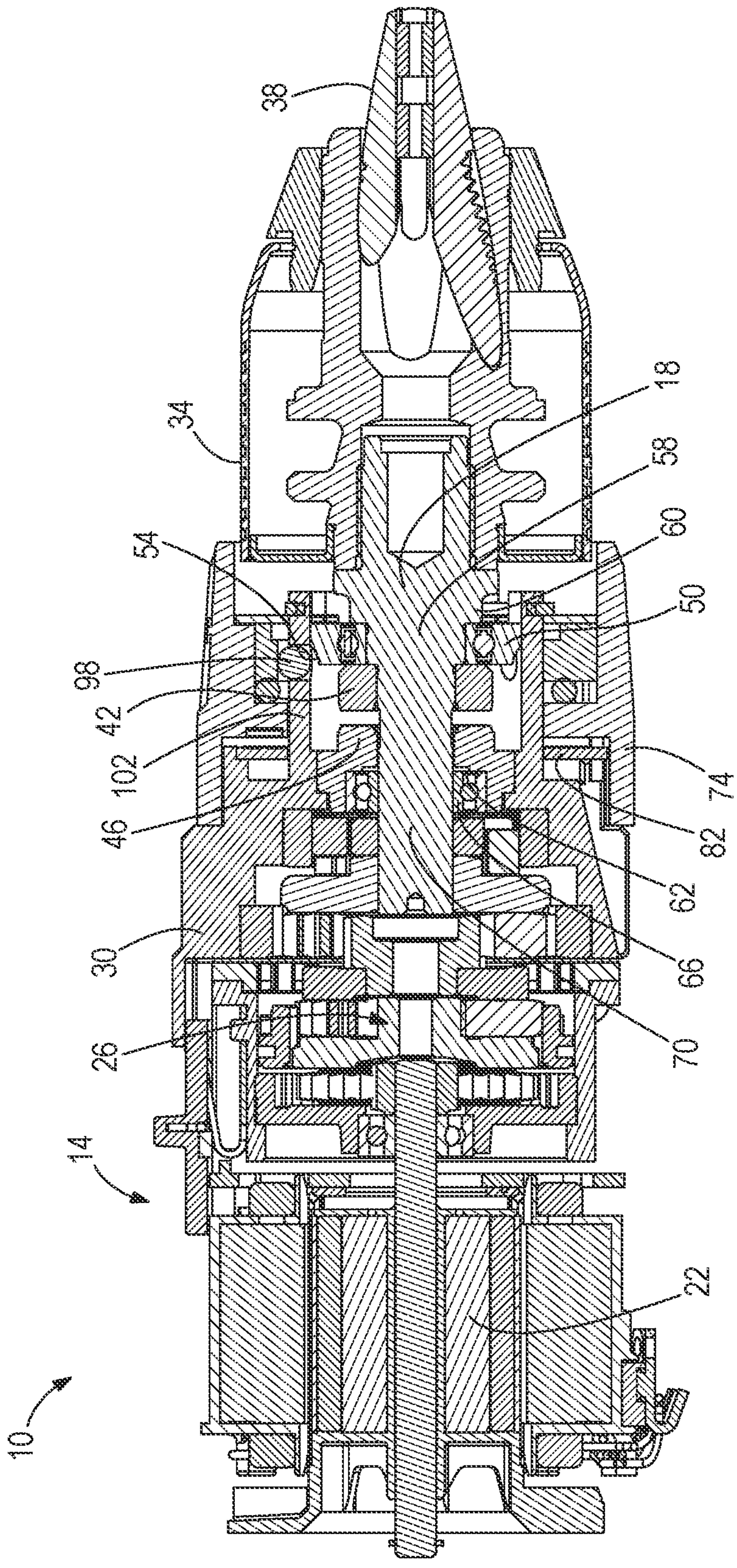
FIG. 2 is a longitudinal cross-sectional view of the hammer drill of FIG. 1.

Referring to FIGS. 1-2, a power tool 10, and more specifically a rotary power tool in the form of a hammer drill in the illustrated embodiment, including a housing 12, a drive mechanism 14 and a spindle 18 rotatable in response to receiving torque from the drive mechanism 14. As shown in FIG. 2, the drive mechanism 14 includes an electric motor 22 (e.g., a brushless direct current electric motor) and a transmission 26 (e.g., a multi-speed planetary transmission) operably coupled between the motor 22 and the spindle 18. The drive mechanism 14 is at least partially enclosed by a transmission housing 30. In other embodiments, the power tool 10 may include other types of drive mechanisms 14, including but not limited to other motive sources (e.g., a brushed DC motor, pneumatic motor, hydraulic motor, etc.) and/or transmissions (e.g., a single-speed planetary transmission, single or multi-stage gear reduction, belt and pulley system, etc.).

As shown in FIGS. 1 and 2, in the illustrated embodiment, a chuck 34 is provided at the front end of the spindle 18 such that the chuck 34 co-rotates with the spindle 18. The chuck 34 includes a plurality of jaws 38 configured to secure a tool bit or a working tool bit (e.g., a drill bit, screwdriver bit, or the like; not shown). Accordingly, when the drive mechanism 14 is operated, the bit can perform a rotary and/or percussive action on a fastener or workpiece.

The power tool 10 includes a pistol grip handle 36, a trigger 39 for activating the motor 22, and an auxiliary handle 40 that can be selectively removed from the transmission housing 30 (FIG. 1). The power tool 10 may be a cordless power tool powered by an on-board power source, such as a removable battery pack 41. Alternatively, the power tool 10 may be powered by a remote power source (e.g., an alternating current source, a compressed air source, etc.) via a cord, hose or the like (not shown).

Figure 2A:
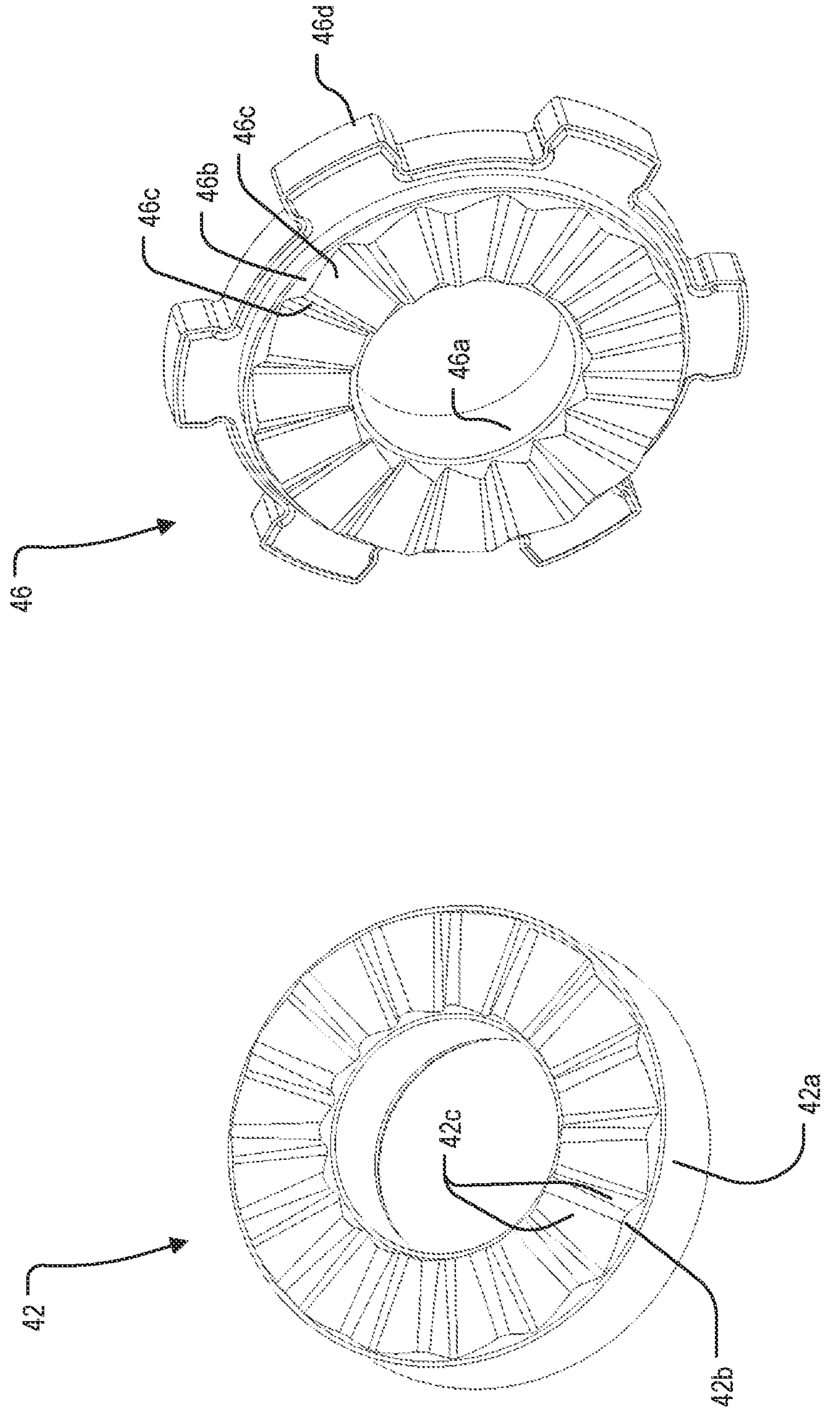
FIG. 2A is a perspective view illustrating a drive element of the hammer drill of FIG. 1, made of bulk metallic glass.

With reference to FIGS. 2 and 2A, the illustrated power tool 10 includes drive elements configured to impart axial motion to the spindle 18 and thereby impart a percussive or hammering action on the fastener or workpiece. The illustrated drive elements include a first ratchet 42 (i.e. a movable ratchet) coupled for co-rotation with the spindle 18 and a second ratchet 46 (i.e. a fixed ratchet) axially and rotationally fixed to the transmission housing 30. In some embodiments, the second ratchet 46 is rotationally fixed to the transmission housing 30 but allowed to translate axially with respect to the transmission housing 30.

Referring to FIG. 2A, in the illustrated embodiment, the first ratchet 42 includes a generally annular body **42*a* and a plurality of teeth 42*b* extending from an axial face (e.g., a rear face) of the annular body 42*a*. Each of the teeth 42*b* includes sliding contact surfaces 42*c* configured to engage and slide along corresponding sliding contact surfaces 46*c* formed on teeth 46*b* of the second ratchet 46. As such, the teeth 46*b* of the second ratchet 46 extend from a front face of an annular body 46*a* of the second ratchet 46. In the illustrated embodiment, the second ratchet 46 also includes radial projections 46*d* spaced about an outer periphery of the annular body 46*a*. The radial projections 46*d* may be received in corresponding recesses (e.g., of the transmission housing 30) to rotationally fix the second ratchet 46 to the transmission housing 30**.

As shown in FIG. 2, a first bearing 50 with an edge 54 is radially positioned between the transmission housing 30 and the spindle 18 and supports a front portion 58 of the spindle 18. In the illustrated embodiment, the edge 54 is concave, but in other embodiments, the edge 54 may be chamfered or a combination of chamfered and concave. The front portion 58 of the spindle 18 includes a radially outward-extending shoulder 60 adjacent to and axially in front of the first bearing 50, such that the spindle 18 is not capable of translating axially rearward unless the first bearing 50 also translates axially rearward. In some embodiments, the first bearing 50 is omitted and the edge 54 is located on the spindle 18.

As shown in FIG. 2, the transmission housing 30 includes a bearing pocket 62 defined proximate a rear end of the second ratchet 46. A second bearing 66 is at least partially positioned in the bearing pocket 62 and supports a rear portion 70 of the spindle 18. In the illustrated embodiment, the second bearing 66 is wholly received in the bearing pocket 62, but in other embodiments the second bearing 66 may at least partially extend from the bearing pocket 62. In some embodiments, the bearing pocket 62 may be formed in the second ratchet 46, such that the second bearing 66 is arranged about the rear portion 70 of the spindle 18 in a nested relationship within the second ratchet 46, thereby reducing the overall length of the power tool 10 while also supporting rotation of the spindle 18.

Figure 3:
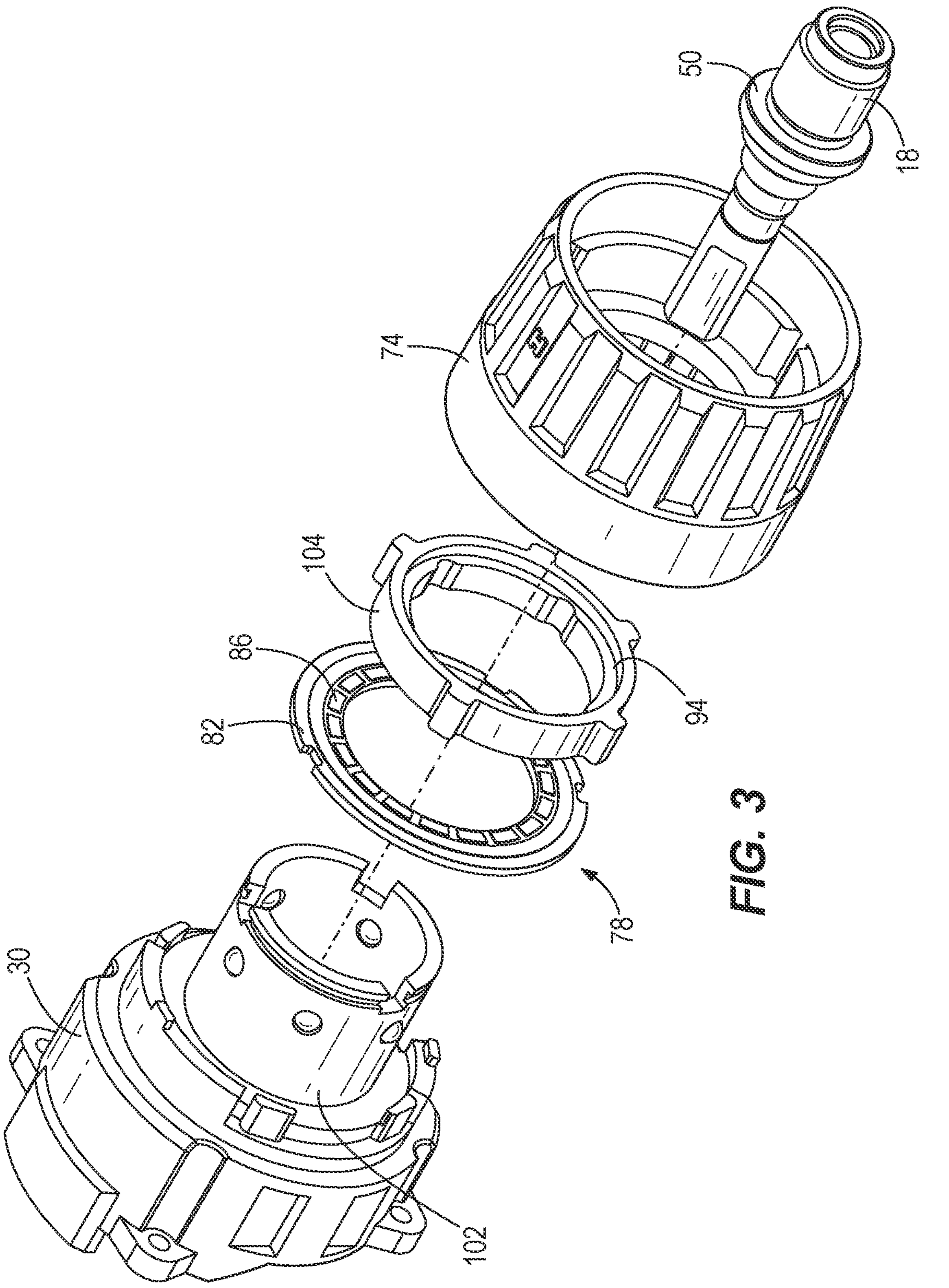
FIG. 3 is an enlarged, exploded view of a front portion of the hammer drill of FIG. 1.

With reference to FIGS. 2 and 3, the power tool 10 includes a collar 74 that is rotatably adjustable by an operator of the power tool 10. Specifically, the collar 74 may be rotated to select different operating modes of the drill 10 and different clutch settings. The power tool 10 also includes an electronic clutch 78 capable of limiting the amount of torque that is transferred from the spindle 18 to a fastener (e.g., when in a specific mode) by deactivating the motor 22 in response to a detected torque threshold or limit. In some embodiments, the torque threshold is based on a detected current that is mapped to or indicative of an output torque of the motor 22. The electronic clutch 78 includes a printed circuit board ("PCB") 82 coupled to the transmission housing 30 and a wiper (not shown), which is coupled for co-rotation with the collar 74. The PCB 82 includes a plurality of electrical pads 86 which correspond to different clutch settings of the power tool 10. In other embodiments, instead of a wiper moving against pads 86, one or more of a potentiometer, hall sensor, or inductive sensor could be used for selecting the different clutch settings or mode settings. In yet other embodiments, the power tool 10 may include a mechanical clutch, or the clutch 78 may be omitted.

In the illustrated embodiment, the power tool 10 also includes a hammer lockout mechanism for selectively inhibiting the first and second ratchets 42, 46 from engaging when the power tool 10 is in a particular mode. The hammer lockout mechanism includes a selector ring 94 coupled for co-rotation with and positioned inside the collar 74, and a plurality of balls 98 (FIG. 2) situated within corresponding radial apertures asymmetrically positioned around a tubular portion 102 of the transmission housing 30. The selector ring 94 includes a plurality of recesses asymmetrically positioned about an inner periphery 104 of the selector ring 94. The number of recesses corresponds to the number of apertures and the number of balls 98 within the respective apertures.

In operation, when the collar 74 and ring 94 are rotated together to a position corresponding to a "hammer drill" mode, the apertures are aligned with their respective recesses in the selector ring 94. Therefore, when the bit held by the jaws 38 contacts a workpiece, the normal force of the workpiece pushes the bit axially rearward, i.e., away from the workpiece. The axial force experienced by the tool bit is applied through the spindle 18 in a rearward direction, causing the spindle 18 to move axially rearward, thus forcing the first bearing 50 to move rearward and the edge 54 of the first bearing 50 to displace each of the balls 98 situated in the respective apertures radially outward to a "unlocking position", in which the balls 98 are partially received into the recesses, thereby disabling the hammer lockout mechanism (in other words, enabling the hammer mechanism). Thus, the teeth 42*b* of the first ratchet 42 are permitted to engage with (i.e. slide over the teeth 46*b* of) the second ratchet 46 to impart reciprocation to the spindle 18 as it rotates.

The illustrated ratchets 42, 46 are made of an amorphous metal alloy material, such as bulk metallic glass (BMG). Bulk metallic glasses include one or more metals, which are melted together and then rapidly cooled, thereby allowing the metal atoms to retain liquid-like positions and form an amorphous alloy (e.g., glass). In some embodiments, the BMG material forming the ratchets 42, 46 has a yield strength of at least 1700 MPa and an elastic modulus of at least 90 GPa. In some embodiments, the BMG material has a fracture toughness of at least 55 MPa$\sqrt{m}$, and a density that is less than 7 g/cc.

The strength-to-weight ratio of the BMG material may be at least twice that of titanium, magnesium, or aluminum, and the hardness of the BMG material may be at least twice that of stainless steels and titanium and at least four times the hardness of aluminum and magnesium. As such, the inventors have determined that forming the ratchets 42, 46 from bulk metallic glass allows the ratchets 42, 46 to withstand greater amounts of contact stress (particularly on the sliding contact surfaces 42*c*, 46*c*) for longer periods of time compared to known ratchets composed of typical crystalline metal materials.

The implementation of ratchets composed of the BMG material may also increase the speed of a drilling operation. More specifically, because the ratchets 42, 46 are composed of bulk metallic glass, the ratchets 42, 46 may impact each other at a higher speed without being damaged. The bulk metallic glass material of the ratchets 42, 46 also has a higher coefficient of restitution than conventional materials, which in turn provides a higher impact energy onto the bit during the hammering operation. Therefore, the hammer drilling operation may be conducted at an overall faster speed, making the power tool 10 operate more quickly and efficiently than known hammer drills. This may be particularly advantageous when the power tool 10 is powered by a battery pack 41, which has a limited capacity.

In alternative embodiments, additional or alternative components of the power tool 10 may be composed of bulk metallic glass. For example, in some embodiments, at least a portion of the spindle 18 may be composed of bulk metallic glass.

Additionally, the inventors have found that bulk metallic glass may be advantageously implemented in other striking percussive mechanism in tools, including but not limited to, hammers in impact drills, rotary hammers, breakers, etc. In such instances, the entire hammer may be composed of bulk metallic glass, or a portion of a multi-piece hammer may be composed of bulk metallic glass. Additionally, or alternatively, bulk metallic glass may be applied as a coating onto a hammer, or portion of a hammer.

Figure 4:
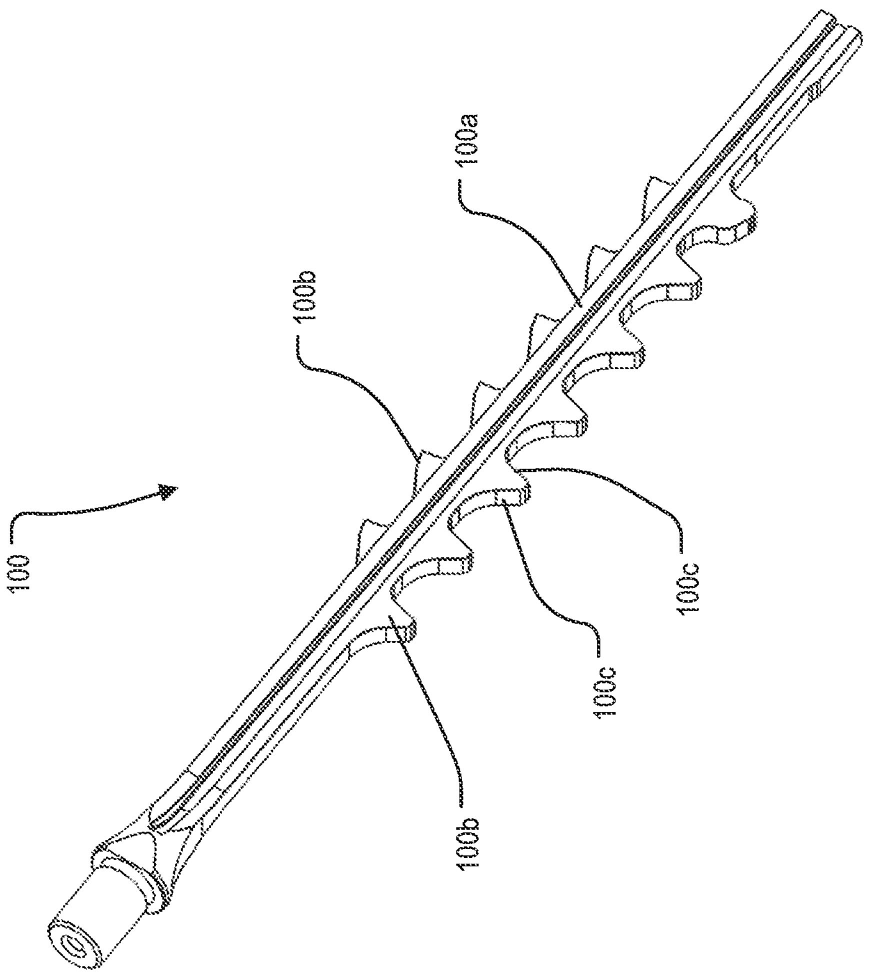
FIG. 4 is a perspective view of a drive element, made of bulk metallic glass, for use in a power tool according to another embodiment.

In another example, one or more components of a power tool, and more specifically a powered fastener driver in the form of a nailer, may be made of bulk metallic glass. More specifically, with reference to FIG. 4, a drive element or driver blade 100 of the powered fastener driver may be made of bulk metallic glass. The illustrated driver blade 100 includes a body 100*a* and a plurality of teeth 100*b* extending in opposite directions from the body 100*a* and arranged along a length direction of the body 100*a*. Each of the teeth 100*b* includes sliding contact surfaces 100*c* that may be susceptible to wear over the life of the fastener driver tool.

Accordingly, in the illustrated embodiment, the driver blade 100, or at least a portion of the driver blade 100, from bulk metallic glass increases the durability and wear resistance and extends the lifespan of the driver blade 100. Furthermore, because bulk metallic glass is a moldable material, the complex 3D geometry of the driver blade 100 may be formed via a molding process without requiring additional machining steps, thereby reducing manufacturing time and cost.

Exemplary embodiments of a powered fastener driver in which the drive element 100 may be incorporated are described in detail in U.S. application Ser. No. 17/214,002, filed on Mar. 26, 2021, the entire content of which is incorporated herein by reference.

As another example, components of a gear box within a power tool may be composed of bulk metallic glass. Because bulk metallic glass includes a greater strength-to-weight ratio than other metals, the gears may be constructed smaller than traditional gears, thereby decreasing the overall size of the tool. Furthermore, bulk metallic glass is approximately three times more elastic or resilient than crystalline metallic alloys. Therefore, the use of bulk metallic glass on gears increases the elastic limit of the gears and may reduce or eliminate the need for lubrication in gearboxes.

In another example, one or more components of a power tool, and more specifically a rotary power tool in the form of a screwdriver, may be made of bulk metallic glass. More specifically, with reference to FIG. 5, a strain gauge transducer 200 of the rotary power tool may be made of bulk metallic glass. In the illustrated embodiment, the transducer 200 includes an outer rim 202, an inner hub 206, and multiple webs 210 interconnecting the outer rim 202 and the inner hub 206. The inner hub 206 of the transducer 200 includes a pair of axially extending, oblong holes 214 radially offset from a central axis L of the hub 206 in opposite directions.

Figure 5:
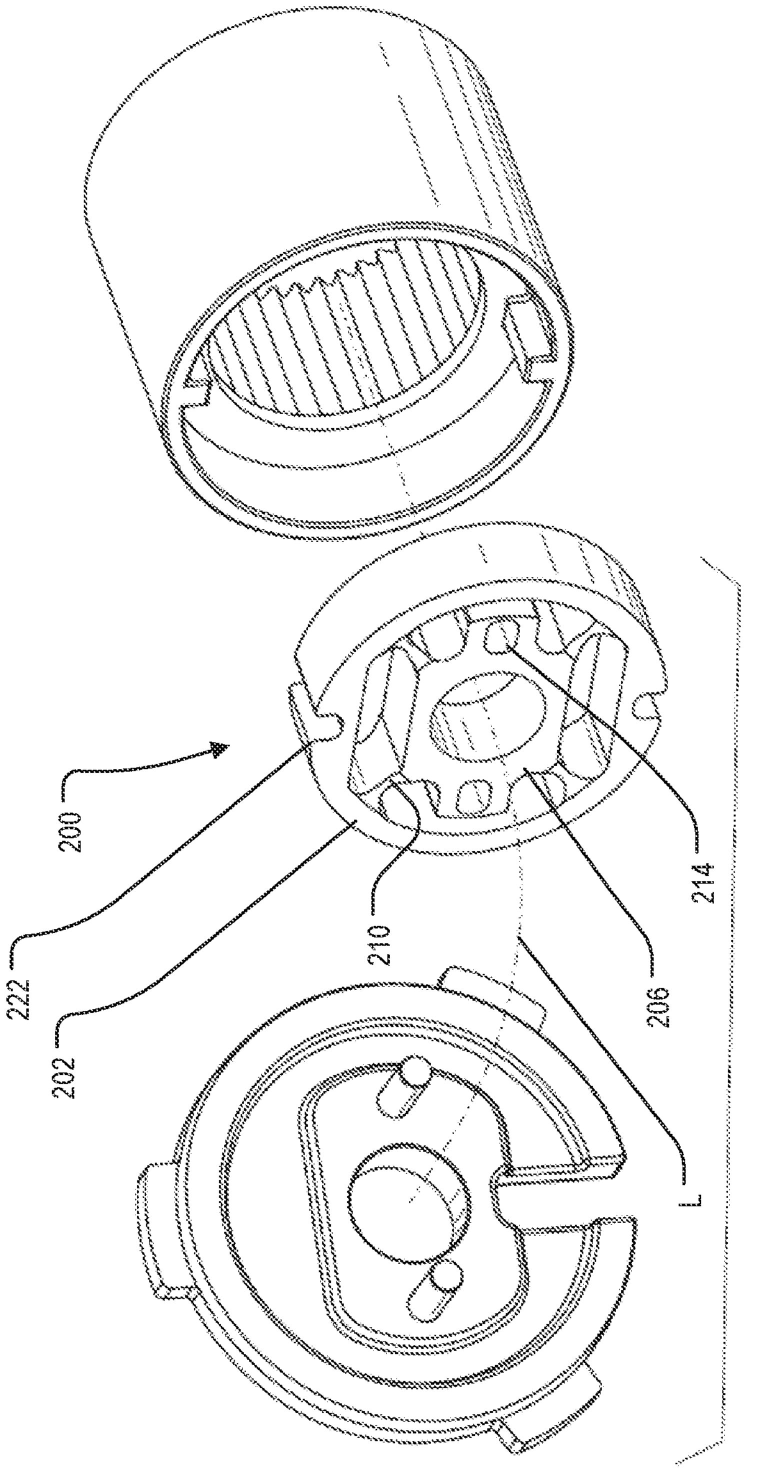
FIG. 5 is an exploded view of a torque transducer, made of bulk metallic glass, for use in a power tool according to another embodiment.

With continued reference to FIG. 5, the outer rim 202 of the transducer 200 is generally circular and defines a circumference interrupted by a pair of radially inward-extending slots 222. In the illustrated embodiment, the slots 222 are angularly offset from the oblong holes 214 by an angle of 90 degrees. Alternatively, the slots 222 may be angularly offset from the oblong holes 214 by any oblique angle between 0 degrees and 90 degrees. As a further alternative, the slots 222 may be angularly aligned with the oblong holes 214 such that the slots 222 and the holes 214 may be bisected by a single plane. Although the illustrated transducer 200 includes a pair of slots 222 in the outer rim 202, more or fewer than two slots 222 may alternatively be defined in the outer rim 202.

The webs 210 are configured as thin-walled members extending radially outward from the inner hub 206 to the outer rim 202. In the illustrated embodiment, the transducer 200 includes four webs 210 angularly spaced apart in equal increments of 90 degrees. A thickness of the webs 210 (measured in a direction parallel with the central axis L) is less than the thickness of the inner hub 206 and the outer rim 202. More particularly, the thickness of each of the webs 210 gradually tapers from the inner hub 206 toward the midpoint of web 210. Likewise, the thickness of each of the webs 210 gradually tapers from the outer rim 202 toward the midpoint of web 210. Accordingly, the thickness of each of the webs 210 has a minimum value coinciding with the midpoint of the web 210. The transducer 200 also includes a sensor (e.g., a strain gauge; not shown) coupled to each of the webs 210 (e.g., by using an adhesive, for example) for detecting strain experienced by the webs 210.

The transducer 200 may be subject to wear/fatigue over the life of the rotary power tool because it is subjected to a reaction torque produced from a tool bit of the rotary power tool engaging with a workpiece. Making the transducer 200, or a portion of the transducer 200, from bulk metallic glass increases the durability and elasticity of the transducer 200. Therefore, the transducer 200 is more capable of withstanding torque, which extends the life of the transducer 200. Furthermore, the bulk metallic glass construction of the transducer 200 may also improve the accuracy and range of the transducer 200. In particular, bulk metallic glass may have an improved linear elastic range under load compared to conventional materials, such that the strain gauges provide a more accurate reading over a greater range of torques. Finally, because bulk metallic glass is a moldable material, the complex 3D geometry of the transducer 200 may be formed via a molding process without requiring additional machining steps, thereby reducing manufacturing time and cost.

Exemplary embodiments of a rotary power tool in which the transducer 200 may be incorporated are described in detail in U.S. application Ser. No. 16/433,288, filed on Jun. 6, 2019, the entire content of which is incorporated herein by reference.

Although the disclosure has been described in detail with reference to certain preferred embodiments, variations and modifications exist within the scope and spirit of one or more independent aspects of the disclosure as described.

Various features and aspects of the disclosure are set forth in the following claims.

What is claimed is:

1. A power tool comprising:

a drive mechanism;

a housing enclosing at least a portion of the drive mechanism;

a spindle rotatable in response to receiving torque from the drive mechanism;

a first drive element coupled for co-rotation with the spindle, the first drive element including a first sliding contact surface; and a second drive element rotationally fixed to the housing, the second drive element including a second sliding contact surface engageable with the first sliding contact surface while the spindle rotates, wherein at least one of the first drive element or the second drive element includes an amorphous metal material.

2. The power tool of claim 1, wherein the amorphous metal material includes a bulk metallic glass.

3. The power tool of claim 1, wherein the first drive element includes a first plurality of teeth defining the first sliding contact surface, and wherein the second drive element includes a second plurality of teeth defining the second sliding contact surface.

4. The power tool of claim 1, wherein the first drive element and the second drive element are both made of the amorphous metal material.

5. The power tool of claim 4, wherein the first drive element and the second drive element are molded from the amorphous metal material.

6. The power tool of claim 5, wherein the first drive element and the second drive element are coated with the amorphous metal material.

7. The power tool of claim 1, wherein the amorphous metal material has a yield strength of at least 1700 MPa and an elastic modulus of at least 90 GPa.

8. The power tool of claim 1, wherein the drive mechanism includes an electric motor, and wherein the power tool further comprises a battery pack configured to provide power to the electric motor.

9. The power tool of claim 1, wherein the second drive element includes a generally annular body and a plurality of radially-extending projections spaced about an outer periphery of the body.

10. The power tool of claim 1, wherein the spindle includes the amorphous metal material.

11. The power tool of claim 1, further comprising a clutch assembly configured to selectively limit torque transfer from the drive mechanism to the spindle.

12. A power tool comprising:

a drive mechanism with a drive element operable to impart an axial force to a workpiece, wherein the drive element includes bulk metallic glass.

13. The power tool of claim 12, wherein the drive mechanism includes a rotatable spindle driven by the motor, and the drive element includes a ratchet configured to impart a reciprocating motion to the spindle.

14. The power tool of claim 12, wherein the power tool is a nailer, and the drive element is a driver blade of the nailer, the driver blade including a body and a plurality of teeth.

15. The power tool of claim 12, wherein the bulk metallic glass has a yield strength of at least 1700 MPa and an elastic modulus of at least 90 GPa.

16. The power tool of claim 12, wherein the bulk metallic glass is coated on to the drive element.

17. The power tool of claim 12, wherein the bulk metallic glass is molded to form the drive element.

18. The power tool of claim 12, further comprising a housing enclosing at least a portion of the drive mechanism; and a spindle rotatable in response to receiving torque from the drive mechanism, wherein the drive element is a first drive element coupled for co-rotation with the spindle, the first drive element including a first sliding contact surface.

19. The power tool of claim 18, further comprising a second drive element rotationally fixed to the housing, the second drive element including a second sliding contact surface engageable with the first sliding contact surface while the spindle rotates, wherein the second drive element includes bulk metallic glass.

20. A transducer for a power tool, the transducer comprising:

a hub;

an outer ring surrounding the hub; and a plurality of webs interconnecting the hub and the outer ring, wherein the transducer is molded from bulk metallic glass.

* * * * *